F. B. HOWELL.
ELECTRIC LOCOMOTIVE.
APPLICATION FILED APR. 20, 1918.

1,275,924. Patented Aug. 13, 1918.

Inventor:
Fred B. Howell,
by Albert G. Davis
His Attorney

UNITED STATES PATENT OFFICE.

FRED B. HOWELL, OF SCHENECTADY, NEW YORK, ASSIGNOR TO GENERAL ELECTRIC COMPANY, A CORPORATION OF NEW YORK.

ELECTRIC LOCOMOTIVE.

1,275,924.  Specification of Letters Patent.  Patented Aug. 13, 1918.

Application filed April 20, 1918. Serial No. 229,695.

*To all whom it may concern:*

Be it known that I, FRED B. HOWELL, a citizen of the United States, residing at Schenectady, in the county of Schenectady, State of New York, have invented certain new and useful Improvements in Electric Locomotives, of which the following is a specification.

This invention relates to electric locomotives and is especially applicable to electric locomotives provided with two trucks.

The trucks of locomotives of this type, when traversing curves, or by reason of inequalities in the rails or road-bed are subjected, at their adjacent ends to lateral or vertical forces resulting in what is commonly referred to as "nosing." To prevent excessive "nosing", it is customary to connect the trucks by a joint which prevents any relative lateral or vertical movement of the adjacent ends, and it is the object of this invention to provide an improved universal joint of simple and rugged construction for this purpose.

Figure 1:
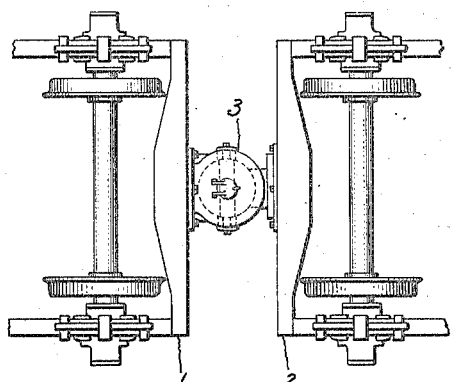
Figure 2:
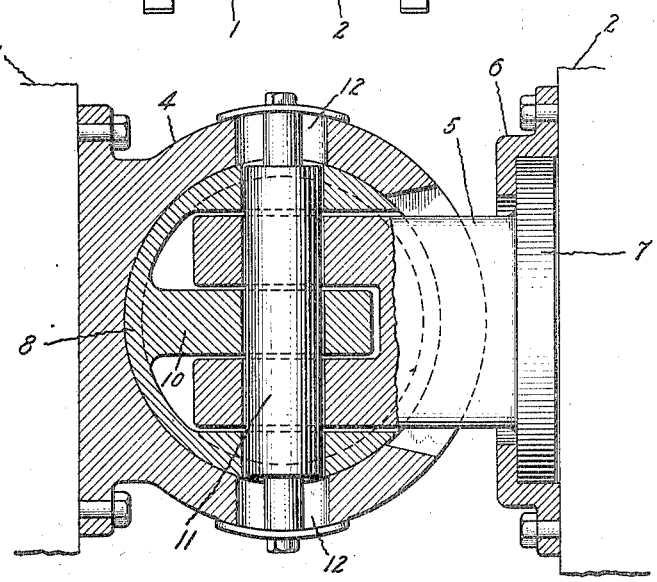
Figure 3:
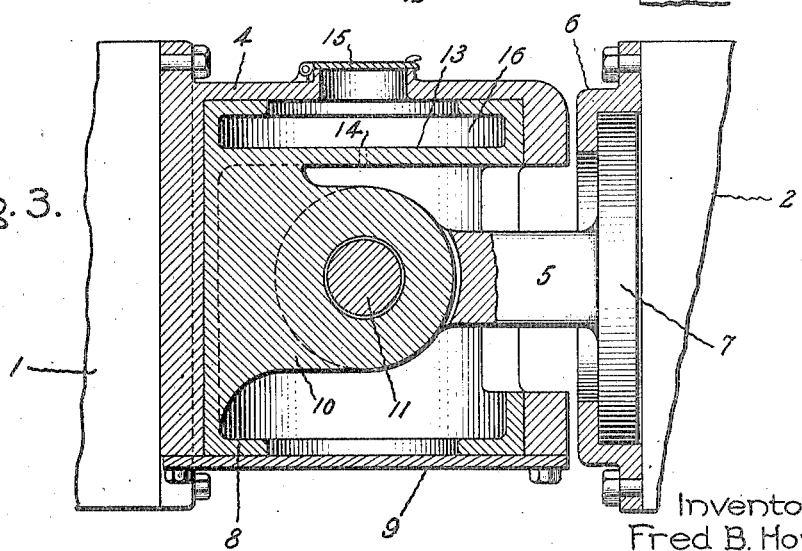

The various features of novelty which characterize my invention are pointed out with particularity in the claims annexed to and forming a part of this specification. The invention will best be understood by reference to the accompanying drawing, in which Figure 1 is a plan view of the adjacent ends of two trucks connected by my improved universal joint; Fig. 2 is a horizontal section, and Fig. 3 a vertical section through the joint.

Referring to Fig. 1 of the drawing, 1 and 2 are the adjacent end members of the frames of two trucks of the locomotive which are of relatively heavy construction to carry the parts of the universal joint 3 which connects the trucks. Each of the trucks is provided with two or more axles, only one of which is shown.

The universal joint 3 comprises a cup-shaped member 4 (Fig. 3) attached to one of the truck end members, a forked member 5 attached for rotation to the adjacent end of the other truck by means of a coupling ring 6 provided with a flange which overlaps the circular foot flange 7 of the forked member 5, and a cylindrical member 8, located within the cup shaped member 4 and free to rotate therein; the forked member having a hinge connection with said cylinder. The cylindrical member 8 is held in place in the member 4 by the plate 9, and is provided with a central lug 10, projecting from the inner face of its side wall, which lug is embraced by the ends of the forked member 4 projecting through openings provided in the walls of the members 4 and 8 opposite the lug 10. The ends of the forked member 5 are hinge connected to the lug 10 by means of a pin 11, the ends of which extend into openings 12 in the walls of the cup-shaped member 4. The pin passes through said cylinder at right angles to the axis thereof. The opening in the cup 4, through which the forked member 5 extends, is made wider than member 5, as shown in Fig. 2, and this construction, together with the mounting of the ends of the pin 11 in the openings 12, in the wall of the cup member 4, permits of limited rotation of cylinder 8 within member 4.

The arrangement of these parts as described, permits of relative angular movement of the members 4 and 5 on three axis, all at right angles and intersecting one another; namely, rotation of the forked member 5 about its horizontal axis by reason of its mounting in the part 6, rotation of the cylinder 8 about its vertical axis, and relative rotation between the members 5 and 8 about the pin 11.

A separate compartment 16 is formed in the upper part of the cylinder 8 by a partition 13. This partition is provided with an oil drip duct 14 so that this compartment may be filled with oil wick. Access to this compartment is obtained through an opening in the top of the member 4. This opening is provided with a cover 15.

I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is:—

1. In a locomotive, the combination with two trucks, of a universal joint comprising a cup-shaped member attached to the end of one truck, a cylinder rotatably mounted in said cup-shaped member, and a forked member rotatably mounted on the adjacent end of the second truck, said forked member having a hinge connection with said cylinder.

2. In a locomotive, the combination with two trucks, of a universal joint comprising a cup-shaped member attached to the end of one truck, a cylinder rotatably mounted in said cup-shaped member and provided with a central lug, and a forked member rotatably mounted on the adjacent end of the second truck, said forked member projecting through an opening wider than itself in the wall of said cup-shaped member and having a hinge connection with said lug on said cylinder.

3. In a locomotive, the combination with two trucks, of a universal joint comprising a cup-shaped member attached to the end of one truck, a cylinder rotatably mounted in said cup-shaped member and provided with a central lug, and a forked member rotatably mounted on the adjacent end of the second truck, said forked member projecting through an opening wider than itself in the wall of said cup-shaped member, and a pin passing through said cylinder at right angles to the axis thereof, on which said forked member is hinged.

4. In a locomotive, the combination with two trucks, of a universal joint comprising a cup-shaped member attached to the end of one truck, a cylinder rotatably mounted in said cup-shaped member and provided with a central lug, and a forked member rotatably mounted on the adjacent end of the second truck, said forked member projecting through an opening wider than itself in the wall of said cup-shaped member and a pin passing through said cylinder at right angles to the axis thereof, on which said forked member is hinged, the ends of said pin extending into openings in the cup-shaped member, said openings permitting movement of said pin with reference to said cup-shaped member.

In witness whereof, I have hereunto set my hand this 18th day of April, 1918.

FRED B. HOWELL.

Copies of this patent may be obtained for five cents each, by addressing the "Commissioner of Patents, Washington, D. C."